Dec. 4, 1951                    J. FENYO                    2,577,320
                    PERFUME CONTAINING PAINTING
                       Filed March 23, 1948
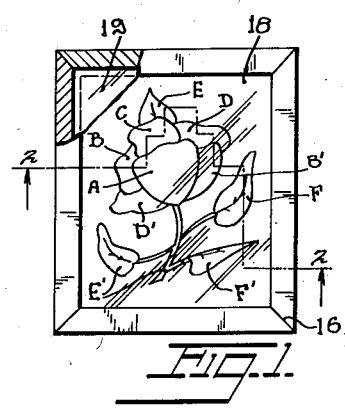
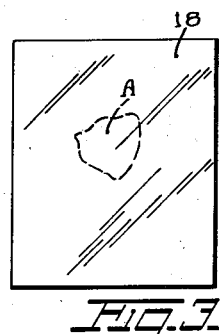
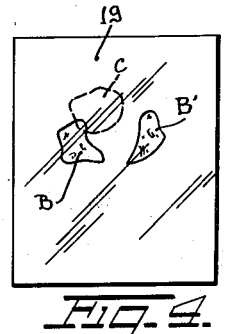
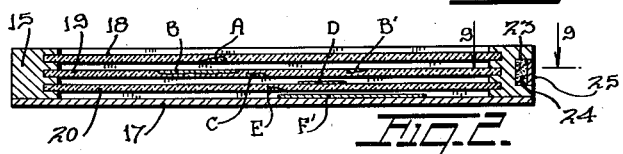
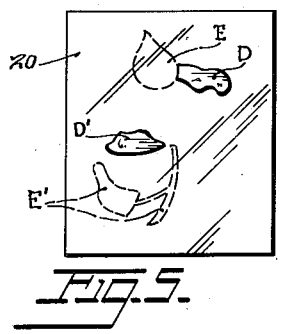
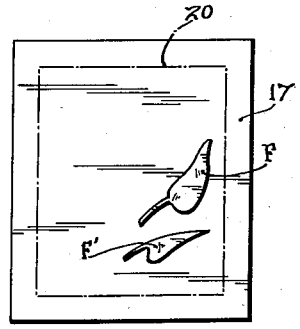
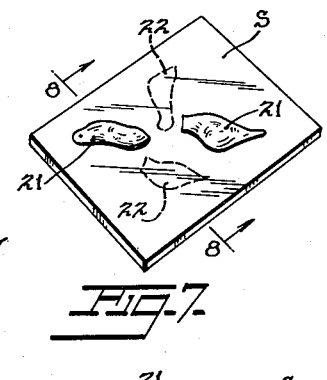
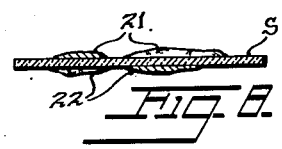
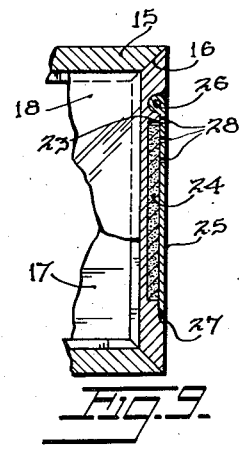
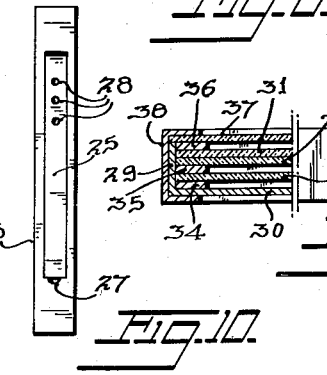
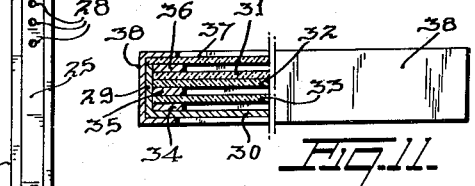
INVENTOR.
JULIUS FENYO
BY
ATTORNEY Patented Dec. 4, 1951

2,577,320

UNITED STATES PATENT OFFICE 2,577,320

PERFUME CONTAINING PAINTING

Julius Fenyo, Freeport, N. Y.

Application March 23, 1948, Serial No. 16,411

1 Claim. (Cl. 41—14)

This invention relates to new and useful improvements in three-dimensional representations, as pictorial ones, and a special object of the invention is to provide a novel and valuable arrangement whereby unusually striking effects of depth and perspective may be obtained.

According to the invention, various components of a representation which in the original or in actuality would be at different distances from the eyes of the observer are similarly or analogously thus displaced relative one to another, and, as the invention is preferably carried out, not only is this done, but some or all of the components, as a whole or in part, are at various portions thereof secondarily variously displaced from planiform extension, to add what may be called a special sculptural effect.

As supports for differently displaced representation components, a plurality of transparent plates or sheets are used; these of glass, a transparent plastic such as lucite, or some other suitable material, and they are assembled stack fashion, either in suitably spaced relation depthwisely of the stack, or, in some cases, with some of the sheets, as one or more pairs of them, in face against face relation, at a part of the assemblage.

One or more of the sheets may carry representation components on both their sides, so that the one or more such components on the far side of such a sheet will lie generally in a plane removed from the one or more such components on the near side of said sheet.

At the extreme back of the stack there may be an opaque sheet, which itself may carry one or more of said components; and/or a suitable background in its entirety.

In regard to the sculptural effect aforesaid, this may be obtained by molding the sheets, or by drilling, tooling, etching or otherwise forming them so as to have particularly shaped recesses in one or both sides of a sheet. In other instances, such sculpturing may be effected to provide formations which, instead of being intaglio in type as just referred to, would be cameo in type, that is, locally raised above the general flatness of one or both sides of a sheet, as by building up such elevations by the use of a plastic clay or other suitable material. As of course will be understood, both intaglio and cameo sculpturings may be variously localized in a single assemblage.

The representation may be a floral one, a landscape, or any scene or ensemble desired, such as a seascape, a portrait, a still life subject of any kind, any scene including a person or persons or other animate participants, etc.

Various colorations may be used, and variously applied, as by printing, painting, spraying, etc. The painting may be in oil, tempera, casein or the like, applied thick or thin; and with these media or artistic expressions used in various combinations.

The invention may be employed to provide a framed picture to be hung or otherwise displayed as such per se, or to provide a panel or the like for incorporation in such an article as a door, a table or tray top, the facia around a fireplace, the wall of a lamp base, etc.

Other media than those above mentioned may be used, alone or in combination with said ones above mentioned; such, for instance, as cut pieces of paper, cloth, leather, etc., either preprinted or prepainted or precolored in any way and/or pre-embossed, or given a corresponding such treatment after being fixed to a supporting sheet. Other effects, for instance, may be obtained by employing an adhesive coating or coatings anywhere on either side of a sheet, for anchoring a collection of glass beads, sequins, sand and other granules, or other suitable material. Said cut pieces may be the leaves, stems or petals of an artificial flower; while also such persistently naturally colored items as butterfly wings may be used.

A feature of the invention is the combination of a three dimensional representation of any of the kinds indicated or otherwise within the scope of the invention as defined by the appended claim, in combination with means for storing a perfume in a way to permit the same gradually and over a long period of time to emit its odor; for instance, a flower scent appropriate to a floral representation, the tangy smell of the ocean in the case of a seascape, a perfume of an incense-like character for a religious group, etc.

For further comprehension of the invention, and of the objects and advantages thereof, reference will be had to the following description and accompanying drawing, and to the appended claim in which the various novel features of the invention are more particular set forth.

In the accompanying drawing forming a material part of this disclosure:

Fig. 1 shows in front elevation, partially broken away and partially in section, one now favored type of embodiment pursuant to the invention, with the assemblage here of such nature as to be usable as a framed picture for hanging or other display, or as a panel for incorporation in a larger article as a decorative subdivision thereof.

Fig. 2 is, on an enlarged scale, a transverse section taken on the line 2—2 of Fig. 1.

Fig. 3 is a top plan view of the transparent sheet uppermost in Fig. 2.

Fig. 4 is a similar view, showing the transparent sheet next below the one just mentioned.

Fig. 5 is a similar view, showing the lowermost of the three transparent sheets shown in Fig. 2.

Fig. 6 is a similar view, showing an opaque bottom sheet.

Fig. 7 is a perspective view of a transparent sheet carrying on both sides locally built up elevations.

Fig. 8 is a transverse section, taken on the line 8—8 of Fig. 7.

Fig. 9 is a horizontal section, taken on the line 9—9 of Fig. 2.

Fig. 10 is a side elevation, looking toward the left in Fig. 9.

Fig. 11 is an end elevation, partially broken away and partially in section, showing a manner of assemblage modified from that of Figs. 1 and 2.

Referring to the drawings more in detail, the assemblage of Figs. 1–10 is illustrated as including a rectangular frame, made up of side and end stretches joined at mitred ends 16, an opaque backing 17, and any selected plurality of transparent sheets, the latter in the present case shown as three, these marked 18, 19 and 20. The backing may be of any appropriate material, and the frame may be of wood, metal, or a plastic.

A very simple floral representation is shown in Fig. 1. The petal components are designated A, B, B', C, D and D', and the remaining components, leaf and stem elements, are designated E, E', F and F'.

All around the frame 15 the same has three grooves as shown in Fig. 2, each for receiving and positioning one of the sheets 18, 19 and 20. Before the frame is assembled thus to mount said sheets, the latter are given their assigned components of the representation, in any of the ways hereinabove explained or in any other way pursuant to the invention. Where the backing 17 is to carry on its upper side any of said components, the latter are applied thereto before attaching said backing, which attachment may be by means of brads, an adhesive or in any way desired.

As shown in Fig. 3 when taken in connection with Fig. 2, the petal A is added to the underside of the sheet 18; as shown in Fig. 4 when taken in connection with Fig. 2, the petals B and B' are added to the upper side of the sheet 19 and the petal C is added to the underside of the same sheet; as shown in Fig. 5 when taken in connection with Fig. 2, the petals D and D' are added to the upper side of the sheet 20 and the stem and leaf elements E and E' are added to the underside of said sheet; and as shown in Fig. 6 when taken in connection with Fig. 2, the stem and leaf elements F and F' are added to the upper side of the opaque backing 17.

As will be understood, a very simple subject has been chosen for illustration, to clarify the drawing and simplify the description; but subjects or representations having multitudinous components may be produced in accordance with the principles of invention. For instance, a large number of transparent sheets may be employed. Also, the background may be an elaborate one, and of many colors; and, also, with localized sculpturings according to the invention.

Referring to these sculpturings, some examples of the infinite variety in which they may be shaped are indicated in Fig. 2. In the present case, such sculpturings are shown as on both sides of the transparent sheets 19 and 20, but merely on the underside of the transparent sheet 18. Note, however, that, by way of example, the coloring matter or other medium added to establish the petal D is applied merely to the flat surface of the sheet 20, as contradistinguished from the way such coloring matter or other media is added for reproducing the other components, that is, by applying same to the hollow contours of the intaglio or recessed formations in the sheets 18, 19 and 20. As will be understood, such sculpturings may be recessed into the upper side of the opaque backing sheet 17.

Referring further to the sculpturings, the same may be provided relative to the sheet 17 and/or any or all of the transparent sheets present, to provide localized elevations as aforesaid. In this case, Fig. 7, by way of example, shows a transparent sheet S, as, for instance, any one of the sheets 18, 19 and 20, having on its upper side a plurality of irregularly conformed elevations 21 and on its under side a plurality of irregularly conformed elevations 22.

The sculpturings, whether of intaglio or cameo type, may be left in natural color, where appropriate, or given appropriate colorings, by use of any suitable media and in any convenient way.

It will be noted from Fig. 4 that the petal C is shown as partially overlapping a portion of the petal B. Such overlapping makes it less tedious properly to add a representation component of exactly the required outline all around, and prevents the representation anywhere over the same as a whole for giving the appearance of having a gap therein when the same is viewed at an acutely oblique angle. Of course, a component to overlie another will be accurately outlined where it projects beyond the latter; but any component underlying another can be extended as desired into a space to below that to be occupied by an overlying component.

In Fig. 6, the dot and dash rectangle represents the frame opening.

In Figs. 2, 9 and 10, the means for using perfume as aforesaid is shown as comprising a recess 23 in the frame 15, of a size to accommodate a suitable wick 24, as a block of felt. Such wick 24 is held in the recess on closing a lid 25 hingedly mounted as at 26. The lid may be lifted, as to replenish the perfume in the wick, by fingernail engagement with the lid as at 27; and when the lid is closed, the odor desired is emitted through suitable apertures of the lid, as indicated at 28.

Referring to Fig. 11, the modified arrangement here shown illustrates a way which has been found desirable to provide a light-weight and relatively inexpensive assemblage. An open-topped box 29, as of cardboard, and with its bottom 30 for providing the equivalent of the opaque sheet 19, is shown as having three transparent sheets 31, 32 and 33 positioned as desired therein by washers 34, 35 and 36. In this case, a fourth transparent sheet, 37, acting as a cover, is desirably of glass. The washers 34 and 35 may well be of cardboard, and the washer 36 may well be of a somewhat cushiony material such as cloth matting. All the parts are established as a single assembly, by adhesively applying a strip 38 of passe partout or the like, all around the box 29 and so as to somewhat marginally overlap the sheet 37, as shown.

The structure of Fig. 11 also shows a further feature of the invention, which may be employed in any embodiment thereof. This feature is illustrated in the case of the sheets 31 and 32, which, it will be noted, are arranged in face against face relation. Such arrangement may be advisable, at one or more depths in the assemblage; and, furthermore, one or more representation components on the underside of the upper of these two sheets may be spaced depthwisely of the assemblage from one or more representation components on the upper side of the lower of these two sheets, to a sometimes desirable very small extent, as, for example, by having one or more of the said components of a sheet or of both sheets wholly or partially inclusive of a sculpturing of the intaglio type.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

Means for perfuming the air surrounding a picture frame enclosing a picture of a flower with a scent resembling that of the illustrated flower, comprising an elongated wick saturated with a suitable perfume, the frame having a vertically elongated recess along one side thereof in which the wick is positioned, and an elongated cover closing the open side of said recess, said cover having apertures through which the aroma from said wick can pass, said cover being pivoted at its top end to depend in a position closing the open side of said recess and with the outer face of said cover flush with the side of the frame, the frame having a notch at the face bottom end of said cover by which a grip can be had on said cover for pivoting it to an open position to expose said wick for resaturation.

JULIUS FENYO.

REFERENCES CITED

The following references are of record in the file of this patent:

UNITED STATES PATENTS

| Number | Name | Date |
| --- | --- | --- |
| 355,982 | Eggert | Jan. 11, 1887 |
| 367,976 | Hartmann | Aug. 9, 1887 |
| 518,806 | Dillmann | Apr. 24, 1894 |
| 1,400,139 | Brosnan | Dec. 13, 1921 |
| 1,707,965 | Scantlebury | Apr. 2, 1929 |
| 1,741,683 | Dickey | Dec. 31, 1929 |
| 1,781,313 | Blau | Nov. 11, 1930 |
| 2,293,696 | Burchell | Aug. 25, 1942 |